United States Patent [19]

Miska et al.

[11] 4,424,682
[45] Jan. 10, 1984

[54] VEHICLE AIR CONDITIONING COMPRESSOR CONTROL SYSTEM

[75] Inventors: Fred S. Miska, Ortonville; James A. Duddles, Pontiac, both of Mich.

[73] Assignee: General Motors Corporation, Detroit, Mich.

[21] Appl. No.: 348,912

[22] Filed: Feb. 16, 1982

[51] Int. Cl.$^3$ .............................................. B60H 3/04
[52] U.S. Cl. .................................... 62/133; 62/158; 62/323.4
[58] Field of Search ................ 62/133, 158, 323.4; 417/12, 14

[56] References Cited

U.S. PATENT DOCUMENTS

| | | | |
|---|---|---|---|
| 3,121,314 | 2/1964 | Koyanagi | 62/133 |
| 3,664,148 | 5/1972 | Yonezu | 62/133 |
| 3,686,891 | 8/1972 | Wills | 62/158 |
| 3,710,587 | 1/1973 | Hayashi | 62/230 |
| 3,724,230 | 4/1973 | Muto | 62/133 |
| 3,844,684 | 10/1974 | Kawamura | 417/13 |
| 4,135,368 | 1/1979 | Mohr et al. | 62/133 |
| 4,226,090 | 10/1980 | Horian | 62/133 |
| 4,274,265 | 6/1981 | Okumura | 62/158 |
| 4,334,255 | 6/1982 | Izumi | 62/133 X |

Primary Examiner—William E. Wayner
Attorney, Agent, or Firm—R. L. Phillips

[57] ABSTRACT

There is disclosed in combination with a vehicle air conditioning compressor control system that normally cycles a refrigerant compressor on and off according to cooling demand, a timed cycling override control that operates to maintain the compressor on and prevent cycling regardless of cooling demand for a preselected time period when the vehicle speed falls below a predetermined speed and the ambient temperature remains above a preselected temperature.

3 Claims, 1 Drawing Figure

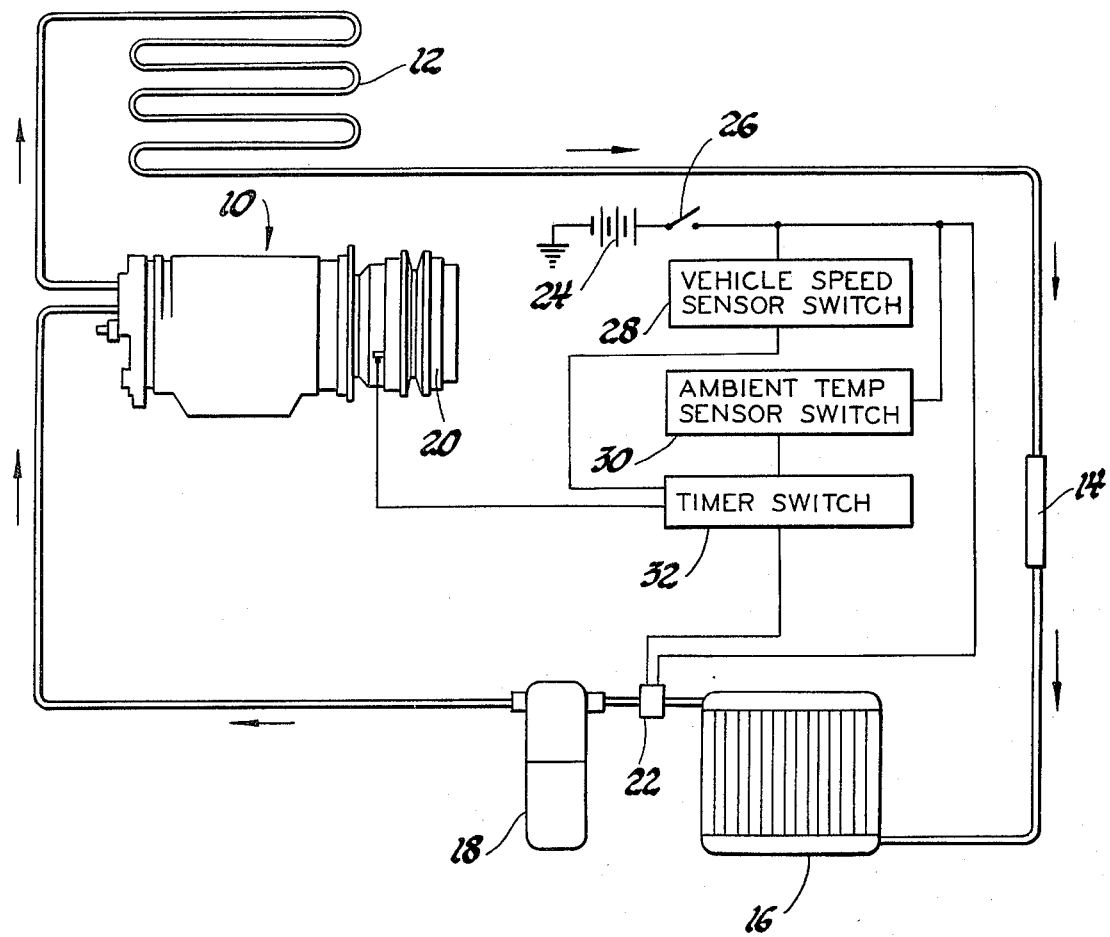

VEHICLE AIR CONDITIONING COMPRESSOR CONTROL SYSTEM

This invention relates to vehicle air conditioning compressor control systems and more particularly to those that provide on-off compressor cycling to control compressor capacity.

In vehicle air conditioning systems wherein the compressor is cycled on and off to control compressor capacity, the clutch cycle feel at idle can be pronounced particularly in small or compact cars where the engine which powers the compressor is relatively small therefor. The conventional approach to this problem is to simply shut the compressor off when the vehicle speed falls below a certain level thereby eliminating the clutch cycle feel but sacrificing air conditioning. It has been found, however, that such a drastic sacrifice is not necessary to achieving general user acceptance of engine/vehicle driveability at idle and that this goal can better be obtained by analyzing the air conditioning requirements as a function of ambient and turning the compressor off or keeping the compressor running constantly at idle conditions under prescribed conditions to avoid clutch cycle feel which can become particularly noticeable while waiting for traffic stop lights.

This is accomplished by simply adding a timed cycling override control to the conventional system that normally cycles the referigerant compressor on and off according to cooling demand. The timed cycling override control comprises timer means, vehicle speed sensing means and temperature sensing means which cooperate to maintain the compressor on continuously for a time period predetermined by the cooperation of a preselected time period on the timer means when the vehicle speed sensed falls below a predetermined speed and the temperature sensed remains above a predetermined temperature whereby the compressor is then prevented from cycling off and on regardless of the cooling demand. If temperature sensed is below a predetermined value, the compressor is turned off. The timed cycling override control is set such that the on time period corresponds to a typical traffic stop light on time period while the determining vehicle speed is set at a selected low road speed approaching zero and the determining temperature is set at a low (cool) ambient temperature. In this way, compressor cycling at traffic stop lights is eliminated and also under extended idle conditions.

These and other objects, features and advantages of the present invention will become more apparent from the following description and drawing in which there is shown a schematic of the preferred embodiment.

Referring to the drawing, there is shown a vehicle air conditioning system basically comprising a compressor 10, condenser 12, orifice tube 14, evaporator 16 and accumulator 18. These components are connected in conventional manner as shown with the compressor discharge connected to the condenser inlet, the condenser outlet connected through the orifice tube 14 to the evaporator inlet and evaporator outlet connected through the accumulator 18 to the compressor suction. The compressor 10 is driven by the vehicle engine (not shown) on engagement of an electromagnetic clutch 20 which is cycled on and off to thereby control compressor capacity. The clutch 20 is controlled by a conventional cycling switch 22 which is powered from the vehicle's battery 24 on closure of a main switch 26 and senses either evaporator outlet temperature or evaporator outlet pressure to regulate compressor capacity according to cooling demand by cycling the clutch on and off.

According to the present invention, there is provided in place of such a conventional system, a timed cycling override control which is connected in series with the clutch cycling switch 22. The override control comprises a vehicle speed sensor switch 28, ambient temperature sensor switch 30 and a timer switch 32 which are connected as shown and may all be of conventional design but set to operate as will now be described. The vehicle speed sensor switch 28 is set so as to close when the vehicle or road speed falls below a predetermined low speed approaching zero such as about five mph and the ambient temperature sensor switch is set so as to close when the ambient temperature rises above a low or cool temperature such as about 50° F. and the timer switch 32 is set to time in and close for a time period corresponding to a selected or typical traffic stop light on time period such as about three minutes. Thus, the normal on-off cycling to control compressor capacity according to cooling demand remains in effect under the control of the cycling switch 22. However, with the above override set conditions and when the vehicle approaches a traffic stop light or other stopped or idle condition and the vehicle speed falls below five mph as sensed by the vehicle speed sensor switch 28 which then closes and provided the ambient temperature is above 50° F. as sensed by the ambient temperature sensor 30 which is then closed, the timer switch 32 times on and closes for the preselected time period of three minutes. The cycling switch 22 is then overridden by the vehicle speed sensor means 28, ambient temperature sensing means 30 and timer means 32 which cooperate to maintain the compressor on continuously for the preselected time period determined by the timer means whereby the compressor is then prevented from cycling off and on regardless of the cooling demand sensed by the normal cycling switch. On the other hand, if the temperature sensed is below the predetermined figure of 50° F., the compressor is turned off and remains off. Thus compressor cycling at a typical stop light idle condition is effectively eliminated without loss of air conditioning and moreover, the cycle feel is minimized under extended idle conditions such as can occur in congested stop and go driving.

To further compensate for extended idle conditions, the timer means may be set to time in for a longer time period such as three to five minutes and then time out for a short time such as one and one-half minutes to prevent icing with these events repeated or cycling so long as vehicle speed remains below and ambient temperature remains above their set value during such idling period. Moreover, it will be appreciated by those skilled in the art that all the above-described override control can be readily provided by a microprocessor based control system with the above inputs.

The above-described preferred embodiment is thus illustrative of the invention which may be modified within the scope of the appended claims.

The embodiments of the invention in which an exclusive property or privilege is claimed are defined as follows:

1. In combination with a vehicle air conditioning compressor control system that normally cycles an engine actuated refrigerant compressor on and off according to cooling demand, a timed cycling override control comprising timer means, vehicle speed sensing means and temperature sensing means for cooperating to maintain the compressor continuously on while the engine is running and during otherwise normal on-off cycling use for a time period predetermined by the cooperation of a preselected time period on the timer means when the vehicle speed sensed falls below a predetermined speed and the temperature sensed remains above a predetermined temperature whereby the compressor is then prevented from cycling off and on regardless of cooling demand.

2. In combination with a vehicle air conditioning compressor control system that normally cycles a refrigerant compressor on and off according to cooling demand, a timed cycling override control comprising timer means, vehicle speed sensing means and temperature sensing means for cooperating to maintain the compressor continuously on while the engine is running and during otherwise normal on-off cycling use for a time period predetermined by the cooperation of a preselected time period on the timer means determined by a selected timer period on the timer means determined by a selected traffic stop light time period when the vehicle speed sensed falls below a predetermined speed and the temperature sensed remains above a predetermined temperature whereby the compressor is then prevented from cycling off and on regardless of cooling demand.

3. In combination with a vehicle air conditioning compressor control system that normally cycles a refrigerant compressor on and off according to cooling demand, a timed cycling override control comprising timer means, vehicle speed sensing means and temperature sensing means for cooperating to maintain the compressor continuously on while the engine is running and during otherwise normal on-off cycling use for a time period about three minutes predetermined by the cooperation of a preselected time period on the timer means when the vehicle speed sensed falls below a predetermined speed about five mph and the temperature sensed remains above a predetermined temperature about 50° F. whereby the compressor is then prevented from cycling off and on regardless of cooling demand.

* * * * *